US010988069B2

(12) United States Patent
Vincent

(10) Patent No.: US 10,988,069 B2
(45) Date of Patent: Apr. 27, 2021

(54) VEHICLE INVENTORY MANAGEMENT SYSTEMS AND METHODS

(71) Applicant: Ford Global Technologies, LLC, Dearborn, MI (US)

(72) Inventor: John Vincent, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 40 days.

(21) Appl. No.: 16/406,979

(22) Filed: May 8, 2019

(65) Prior Publication Data

US 2020/0354171 A1   Nov. 12, 2020

(51) Int. Cl.
*B60P 1/52* (2006.01)
*B65G 13/02* (2006.01)
*B65G 67/24* (2006.01)
*B65G 47/46* (2006.01)
*B65G 67/08* (2006.01)

(52) U.S. Cl.
CPC ............... *B60P 1/52* (2013.01); *B65G 13/02* (2013.01); *B65G 47/46* (2013.01); *B65G 67/08* (2013.01); *B65G 67/24* (2013.01)

(58) Field of Classification Search
CPC ........................................................ B60P 1/52
See application file for complete search history.

(56) References Cited

U.S. PATENT DOCUMENTS

| 2,521,727 A | * | 9/1950 | Kappen | B60P 1/00 414/501 |
| 3,712,495 A | * | 1/1973 | Carder | B64F 1/22 414/503 |
| 3,905,494 A | * | 9/1975 | Yatagai | B60P 1/36 414/564 |

(Continued)

FOREIGN PATENT DOCUMENTS

WO   WO-2018111264 A1 *  6/2018   ........... G60Q 10/083

OTHER PUBLICATIONS

Collins, T. (Feb. 27, 2017) "Ford plans self-driving vans and drones that could make high speed deliveries in cities of the future" (36 pages). Retrieved from https://www.dailymail.co.uk/sciencetech/article-4263992/Self-driving-vans-drones-make-deliveries-easier.html.

(Continued)

*Primary Examiner* — Thomas Randazzo
(74) *Attorney, Agent, or Firm* — Brandon Hicks; Eversheds-Sutherland (US) LLP

(57) ABSTRACT

Exemplary embodiments described in this disclosure generally pertain to vehicle inventory management systems. In one exemplary embodiment, a bed of rollers includes a first section located in an enclosed cargo area of a delivery vehicle and a second section located in an alcove that is accessible from outside the delivery vehicle. Various items for delivery are placed upon the bed of rollers in the enclosed cargo area. The rollers, which are coupled to servomotors, can be rotated in various directions under (Continued)

control of a computer. The computer activates the rollers for moving items around inside the delivery vehicle. Upon reaching a delivery destination, an item can be moved into the alcove for pickup by a person outside the delivery vehicle. The alcove is configured to allow access to the item by the person outside the delivery vehicle, but prevents access to other items located in the enclosed cargo area.

19 Claims, 9 Drawing Sheets

(56) References Cited

U.S. PATENT DOCUMENTS

| | | | | |
|---|---|---|---|---|
| 4,505,126 | A * | 3/1985 | Jones | B60P 3/205 |
| | | | | 280/43.22 |
| 5,395,204 | A * | 3/1995 | Balik | B60P 1/006 |
| | | | | 198/697 |
| 6,622,846 | B1 * | 9/2003 | Dean | B60P 1/52 |
| | | | | 198/370.09 |
| 9,132,975 | B2 | 9/2015 | Criswell | |
| 10,322,660 | B1 * | 6/2019 | Dermeche | B60P 1/38 |
| 10,577,180 | B1 * | 3/2020 | Mehta | B25J 9/1697 |
| 2003/0033825 | A1 * | 2/2003 | Goosman | B60P 3/14 |
| | | | | 62/239 |
| 2006/0064993 | A1 * | 3/2006 | Tofflemire | B60H 1/00014 |
| | | | | 62/132 |
| 2008/0036238 | A1 * | 2/2008 | Weeda | B60P 3/20 |
| | | | | 296/146.1 |
| 2009/0035106 | A1 * | 2/2009 | Mammone | B66F 9/07563 |
| | | | | 414/389 |
| 2017/0087599 | A1 * | 3/2017 | Akiyama | B08B 11/00 |
| 2017/0107056 | A1 * | 4/2017 | Kadaba | B65G 1/137 |
| 2017/0129379 | A1 * | 5/2017 | Boscher | B60P 1/649 |
| 2017/0349079 | A1 * | 12/2017 | Wilkinson | B60P 3/205 |
| 2018/0105092 | A1 * | 4/2018 | Putcha | B60P 1/36 |
| 2018/0189716 | A1 * | 7/2018 | Crone | G06Q 10/08355 |
| 2018/0189725 | A1 * | 7/2018 | Mattingly | G06K 19/0723 |
| 2018/0194575 | A1 * | 7/2018 | Anderson | G06Q 50/28 |
| 2018/0297781 | A1 * | 10/2018 | Alkhaldi | G06Q 10/087 |
| 2018/0330313 | A1 * | 11/2018 | Clarke | G06Q 10/08 |
| 2019/0152376 | A1 * | 5/2019 | Schwartz | G06Q 10/087 |
| 2019/0220032 | A1 * | 7/2019 | Skorinko | G05D 1/0246 |
| 2019/0295028 | A1 * | 9/2019 | Orth | B60P 1/6418 |
| 2019/0317498 | A1 * | 10/2019 | Mere | H04W 4/40 |
| 2019/0343317 | A1 * | 11/2019 | Cantrell | A47G 29/1248 |
| 2020/0247302 | A1 * | 8/2020 | Buttolo | B60J 5/0491 |

OTHER PUBLICATIONS

Van Den Driest, J. "Technology Information: Automated Truck Loading Systems," Ancra Systems BV, 2010 (16 pages). Retrieved from http://www.ancra.nl/upload/docs/whitepaper-atls-technology-information-ancra-systems.pdf.

* cited by examiner

VEHICLE INVENTORY MANAGEMENT SYSTEMS AND METHODS

FIELD OF THE DISCLOSURE

This disclosure generally relates to inventory management systems, and more particularly relates to inventory management systems and methods applicable to delivery vehicles.

BACKGROUND OF THE DISCLOSURE

Delivery services for delivering various types of products have been around for many years. Most of these delivery services use drivers for driving delivery vehicles and have attempted to maximize profit margins by optimizing various operating parameters such as inventory management, delivery routes, delivery times, driving distances, and vehicle fuel consumption. The delivery services have also attempted to minimize time spent by drivers when driving along a delivery route and when delivering packages at customer locations. However, certain operations that may benefit from additional scrutiny and optimization may have been left unidentified and unaddressed at this time.

For example, it may be desirable to minimize the amount of time spent by a driver on identifying and extracting a package from inside a delivery vehicle after reaching a delivery destination. Typically, a driver of a delivery vehicle places packages inside the delivery vehicle in some sort of order that he/she personally prefers and then uses his/her memory to retrieve the right package at each delivery destination. Some of the more experienced drivers may become relatively efficient at carrying out deliveries in this manner. However, some less experienced drivers, as well as relatively disorganized drivers, may spend too much time in identifying, retrieving, and delivering the packages at the various destinations. It is therefore desirable that time spent in sorting and placing the packages inside the delivery vehicle and in identifying the packages at the various destinations be minimized so as to improve operating efficiency and reduce delivery costs. In some other cases, the packages being delivered may be grocery items or perishables that require measures to be taken to prevent contamination from other items placed in the delivery vehicle. Existing procedures for doing so may be left to the discretion of the driver or a person loading such packages on to the delivery truck, thereby risking sub-standard delivery quality.

As another example, some delivery companies have started trials for delivering products using autonomous vehicles. The use of autonomous vehicles may provide certain benefits. However, certain aspects associated with such deliveries may require additional scrutiny and addressing. One such aspect is pilferage of products transported by an autonomous vehicle. In one exemplary scenario, a computer in an autonomous vehicle may open a door of the vehicle to allow a customer to reach in and retrieve a package that is intended for the customer. However, an unscrupulous customer may not only retrieve his/her own package but may decide to pilfer some other packages that are intended for other customers. It is therefore desirable to provide solutions that can prevent such pilferage.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION OF THE DISCLOSURE

Figure 1:
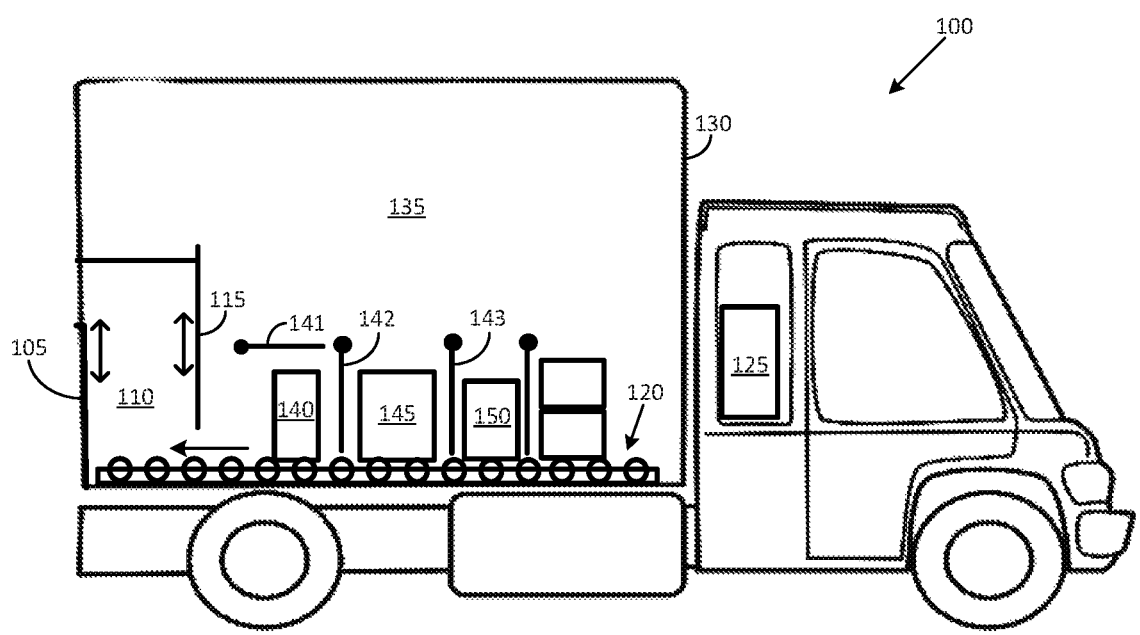
FIG. 1 shows a cut-away view of a delivery vehicle incorporating a first exemplary embodiment of a vehicle inventory management (VIM) system in accordance with the disclosure.

The disclosure will be described more fully hereinafter with reference to the accompanying drawings, in which exemplary embodiments of the disclosure are shown. This disclosure may, however, be embodied in many different forms and should not be construed as limited to the exemplary embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described exemplary embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and terms are used herein solely for convenience and such words and terms should be interpreted as referring to various objects and actions that are generally understood in various forms and equivalencies by persons of ordinary skill in the art. For example, the word "vehicle" as used herein encompasses various types of automobiles such as vans and trucks that are driven by human operators and automobiles that are autonomously operated, and also encompasses other modes of transporting packages such as trailers that are detachably attached to vehicles. The phrase "autonomous vehicles" refers to automobiles that may be alternatively known by various other labels such as self-driving vehicles and robotic vehicles. The word "item" as used herein generally refers to various types of objects transported in a delivery vehicle, such as, for example, packages, parcels, shipping boxes, consumable items (pizza, groceries, etc.), and freight goods. The word "alcove" as used herein generally refers to a compartment or sub-enclosure located inside a delivery vehicle. The word "panel" as used herein refers to any type of structure or element that can be used to create partitions, compartments, or segments. The words "example" and "exemplary" as used herein is intended to be non-exclusionary and non-limiting in nature. More particularly, the word "exemplary" as used herein indicates one among several examples, and it should be understood that no special emphasis or preference is being applied to the particular example being described.

OVERVIEW

In terms of a general overview, certain embodiments described in this disclosure are directed to vehicle inventory management systems associated with delivery vehicles. In one exemplary embodiment, a delivery vehicle is provided with a bed of rollers upon which packages can be placed. The bed of rollers may include a first section located in an enclosed cargo area of the delivery vehicle and a second section located in an alcove that is accessible from outside the delivery vehicle. The sections of the cargo area may be separated by movable panels or wall sections that can be selectively repositioned as the items are moved within the cargo area. A computer, which may be provided inside the delivery vehicle, may activate some or all of the rollers in the bed of rollers in order to move items around inside the delivery vehicle and to move an item into the alcove when the item is ready to be picked up by a person outside the delivery vehicle. The alcove is configured to allow access to the item by the person outside the delivery vehicle, but prevents access to other items located in the enclosed cargo area.

EXAMPLE EMBODIMENTS

FIG. 1 shows a cut-away view of a delivery vehicle 130 incorporating a first exemplary embodiment of a vehicle inventory management (VIM) system 100 in accordance with the disclosure. The delivery vehicle 130 can be an autonomous vehicle in one example implementation and a driver-operated vehicle in another. The VIM system 100 includes an exemplary bed of rollers 120 having a first section located in an enclosed cargo area 135 of the delivery vehicle 130 and a second section located in an alcove 110 that is accessible from outside the delivery vehicle 130. Some, or all, of the rollers in the bed of rollers 120 may be coupled to servomotors (not shown) that are configured to receive control signals from a computer 125.

In one exemplary implementation, the computer 125 may provide a first type of control signal to a servomotor to make a roller rotate in a first direction and a second type of control signal to make the roller rotate in a second, or opposite direction. Providing the first type of control signal to the servomotor may involve applying a voltage of a first polarity to a terminal of the servomotor in order to make the roller rotate, for example, in a clockwise direction. Providing the second type of signal to the servomotor may involve applying a voltage of an opposite polarity to the terminal of the servomotor in order to make the roller rotate, for example, in a counter-clockwise direction.

In another exemplary implementation, the computer 125 may provide a first type of control signal to move an axel of a roller in order to orient the roller in a first direction and a second type of control signal to orient the roller in a second direction. The second direction may be opposite to the first direction in one case and may be angular with respect to the first direction (45 degrees, for example) in another case. This aspect is described below with reference to another figure.

The alcove 110 includes a roof portion and a set of panels on each of three sides. This configuration provides isolation of the alcove 110 from the enclosed cargo area 135 of the delivery vehicle 130. Some or all of the panels may be movable panels that may be moved, for example, by servomotors coupled thereto (not shown). In one exemplary implementation, the computer 125 may provide a first control signal to a servomotor that is coupled to a movable panel 115 so as to selectively position the movable panel 115. In this example embodiment, the movable panel 115 may be selectively moved up or down, or in some embodiments it may be moved side to side. The movable panel may comprise a rigid or semi-rigid panel that is hinged to rotate 90 or more degrees in either direction, or it may be configured to move up or down by being wound or unwound, respectively, around a rotating spindle positioned above the compartments of the cargo area. The computer 125 may then activate a set of rollers in the bed of rollers 120 to move an item 140 from the enclosed cargo area 135 of the delivery vehicle 130 into the alcove 110. The computer 125 may provide a second control signal to the servomotor that is coupled to the movable panel 115 after the item 140 has been moved into the alcove 110. The servomotor responds to the second control signal by moving the movable panel 115 downwards so as to prevent access to the enclosed cargo area 135 from the alcove 110. After the item 140 has been moved into the alcove 110 and the movable panel 115 moved downwards, the computer 125 may provide a third control signal to a servomotor that is coupled to an exterior-facing door 105 so as to open the exterior-facing door 105 when the delivery vehicle has reached a delivery destination. A person, such as a customer, can reach into the alcove 110 for retrieving the item 140 but would be unable to access any of the other items located in the enclosed cargo area 135.

Preventing a customer from accessing other items located in the enclosed cargo area 135 provides various security measures particularly when the delivery vehicle is an autonomous vehicle and a driver is not present to ensure that the customer does not pick up items that are not intended for him/her. In an exemplary delivery procedure, the computer 125 determines that the customer is the intended recipient of the item 140, prior to the delivery vehicle 130 reaching the delivery location, which may be one of several delivery locations on a delivery route. The computer 125 then identifies a first location of the item 140 upon the bed of rollers 120. After identifying the first location, the computer 125 provides control signals to a set of rollers in the bed of rollers 120 to move the item 140 from the first location to a second location that is adjacent to the movable panel 115. Moving the item 140 from the first location to the second location may include moving one or more movable panels, such as a movable panel 141, a movable panel 142 and a movable panel 143 that are illustrative examples of some types of movable panels. Movable panel 141 is shown moved out of the way to allow item 140 to be moved from the first location to the second location, which is adjacent to the movable panel 115. Each of the movable panel 142 and movable panel 143 is placed in a closed position, thereby preventing an item 145 from making contact with the item 140 as well as another item 150. Preventing contact between the various items provides several benefits such as preventing cross-contamination between packages and preventing damage due to collision between packages. The movable panel 141, the movable panel 142 and the movable panel 143 may be opened under control of the computer 125 if the item 150 is to be moved into the alcove 110 after item 140 and item 145 has been moved into the alcove 110. Such an arrangement allows multiple packages to be moved into the alcove 110 for delivery to the customer. Moving one or more items into the alcove 110 may be carried out prior to the delivery vehicle 130 reaching the delivery location, such as during transit or when stopped at a previous location, thereby minimizing the amount of time spent on delivering the item 140 to the customer.

Figure 2:
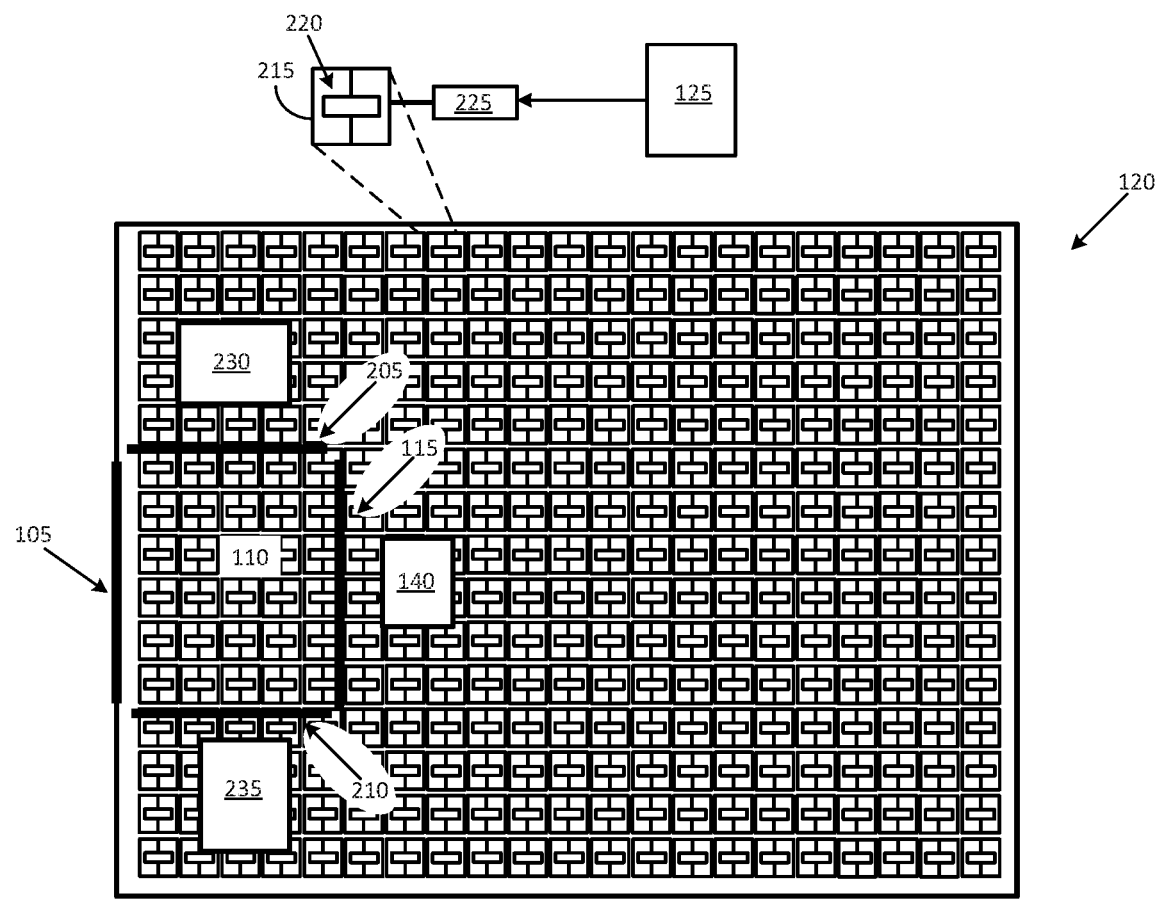
FIG. 2 shows a first exemplary bed of rollers that may be a component of a VIM system in accordance with the disclosure.

FIG. 2 shows a first exemplary embodiment of the bed of rollers 120 that may be a component of the VIM system 100 in accordance with the disclosure. In this exemplary embodiment, the bed of rollers 120 has a rectangular shape and the rollers are arranged in a matrix configuration. However, in other embodiments, the bed of rollers 120 can have other shapes and the rollers may be arranged in other configurations.

An expanded view of one of the rollers in the bed of rollers 120 includes a roller element 220 mounted on a base 215. The base 215 may be coupled to a servomotor 225 in an arrangement that allows the servomotor 225 to rotate the roller element 220. In a first example implementation, the roller element 220 may be a wheel mounted on an axial. The servomotor 225 can rotate the wheel in a clockwise direction when the computer 125 provides a first control signal to the servomotor 225. An item that is placed upon the bed of rollers 120 and in contact with at least the roller element 220 can be moved in a first direction when the roller element 220 rotates in the clockwise direction. The servomotor 225 can rotate the wheel in a counter-clockwise direction when the computer 125 provides a second control signal to the servomotor 225. The item that is placed upon the bed of rollers 120 and in contact with at least the roller element 220 can be moved in a second direction that is opposite to the first direction, when the roller element 220 rotates in the counter-clockwise direction. In a variation of this example implementation, the base 215 may include an axel that is pivotable such that the wheel can be aligned in various directions or the axel may be mounted in the base 215 with an angular orientation. This arrangement, which allows various items to be moved in various directions upon the bed of rollers 120, is described below with reference to another figure.

In a second example implementation, the roller element 220 may be a rollerball and the base 215 is a mounting fixture that allows the rollerball to rotate in various directions under control of the computer 125. An item that is placed upon the bed of rollers 120 and in contact with at least the roller element 220 can be moved in various directions so as to allow items to be moved in various directions upon the bed of rollers 120.

The alcove 110 in this exemplary embodiment, includes a movable panel 205 and a movable panel 210 in addition to the movable panel 115 shown in FIG. 1. Operations pertaining to the movable panel 115 and moving of the item 140 from the bed of rollers 120 and into the alcove 110 has been described above. One or both of the movable panel 205 and the movable panel 210 can also be selectively repositioned under control of the computer 125 so as to allow one or more other items to be moved from the bed of rollers 120 and into the alcove 110. For example, the computer 125 may send a first control signal to a servomotor that is coupled to the movable panel 205 to move the movable panel 205 upwards. After the movable panel 205 has been moved upwards, the computer 125 may send control signals to one or more servomotors coupled to a set of rollers in the bed of rollers 120 in order to move an item 230 into the alcove 110. The computer 125 can similarly operate the movable panel 210 for moving an item 235 into the alcove 110 from another location. In some instances, more than one item may be moved into the alcove 110. Moving multiple items into the alcove 110 may be carried out when the multiple items are to be concurrently delivered to a customer.

Figure 3:
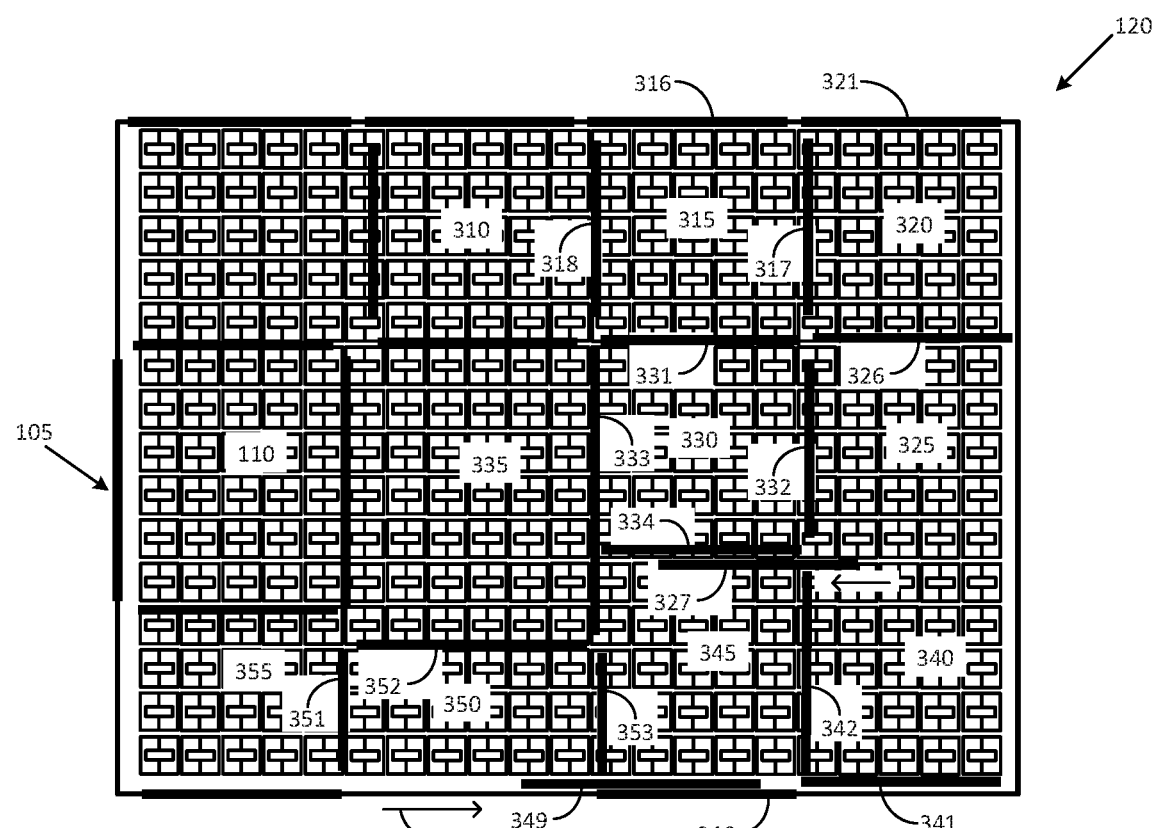
FIG. 3 shows a second exemplary bed of rollers that may be a component of a VIM system in accordance with the disclosure.

FIG. 3 shows a second exemplary embodiment of the bed of rollers 120 that may be a component of the VIM system 100 in accordance with the disclosure. The second exemplary embodiment of the bed of rollers 120 is a variation of the first exemplary embodiment described above. In this second exemplary embodiment, a portion of the bed of rollers 120 that is located in the enclosed cargo area 135 of the delivery vehicle 130 is partitioned into a set of compartments. Each compartment may include one or more movable panels. For example, a compartment 330 that is provided in an interior section of the bed of rollers 120 may include a movable panel 331, a movable panel 332, a movable panel 333, and a movable panel 334 arranged in a square-shaped configuration. As another example, a compartment 325 may include a movable panel 326, the movable panel 332, and a movable panel 327 located on three sides of a square-shaped configuration. The movable panel 327 is shown in an open position in this exemplary illustration. The fourth side of the compartment 325 is a wall of the delivery vehicle 130. The wall may operate as a partition that separates the enclosed cargo area 135 from a cabin in which a driver is seated.

Some of the compartments that are located on the peripheral portions of the bed of rollers 120 may include movable panels and may also include an exterior-facing door. For example, a compartment 340 may include the movable panel 327, a movable panel 342, and an exterior-facing door 341. The computer 125 may provide a control signal to a servomotor that is coupled to the exterior-facing door 341 for opening the exterior-facing door 341 when the delivery vehicle 130 has reached a delivery destination. A person, such as a customer, can then reach into the compartment 340 from a curb for retrieving an item located in the compartment 340. In a first exemplary operation, the movable panel 342 and the movable panel 327 are placed in a closed position by the computer 125 to prevent the customer from accessing any of other items located in the compartment 345 or the compartment 325, each of which is located adjacent to the compartment 340. In a second exemplary operation, the movable panel 342 is placed in a closed position by the computer 125 and the movable panel 327 is placed in an open position (as illustrated) so as to allow the customer to retrieve an item located in the compartment 340 as well as another item located in the compartment 325.

The item that is retrieved from the compartment 340 (or from the compartment 325) by the customer may have been located in a different compartment during an earlier period of time and is moved into the compartment 340 prior to the delivery vehicle 130 reaching the delivery destination. In an example operation, the movable panel 332 may be opened by the computer 125 to allow an item that is located in the compartment 330 to be moved into the compartment 325 before the delivery vehicle 130 reaches the delivery destination.

In another example operation, the movable panel 332 may be placed in an open position by the computer 125 in order to use both the compartment 330 and the compartment 325 to accommodate an item that may be too large to accommodate in a single compartment. One or more of the other movable panels may be similarly opened or moved out of the way prior to loading of the various articles into the cargo area 135, so as to configure the enclosed cargo area 135 to accommodate packages of various sizes.

In a first exemplary embodiment, each movable panel may have a configuration that is similar to a garage door. The computer 125 can reposition such a movable panel by moving the movable panel upwards and then parallel to a ceiling of the delivery vehicle 130. In a second exemplary embodiment, each movable panel may have a configuration that is similar to an elevator door. The computer 125 can reposition such a movable panel by moving the movable panel sideways. One or both of these exemplary embodiments may be applicable to other movable panels and exterior-facing doors of the delivery vehicle 130.

The elevator door type of operation may be illustrated by an exemplary operation of the exterior-facing door 349, which provides access to the compartment 350 from outside the delivery vehicle 130. The computer 125 may provide a control signal to a servomotor that is coupled to the exterior-facing door 349 for opening the exterior-facing door 349 when the delivery vehicle 130 has reached a delivery destination. In this exemplary implementation, the exterior-facing door 349 slides to the right (as indicated by an arrow 347) parallel to, and in front of, an exterior-facing door 346 of the compartment 345. A person, such as a customer, can then reach into the compartment 350 from the curb for retrieving an item located in the compartment 350. The movable panel 351, the movable panel 352, and the movable panel 353 may be placed in a closed condition by the computer 125 to prevent the customer from accessing any of the other items located in the compartment 355, the compartment 335, or the compartment 345 located adjacent to the compartment 350. The exterior-facing doors of each of the other compartments, such as the compartment 355, the compartment 345, and the compartment 340 that are also located on the peripheral portion of the bed of rollers 120 may be similarly configured to allow a customer to retrieve one or more items from the curb-side of the delivery vehicle 130.

In some exemplary implementations, some or all of the compartments located in the peripheral area of the bed of rollers 120 and accessible to a customer from a road-facing side of the delivery vehicle 130 may also be configured to allow the customer to access items located in the compartments. For example, a compartment 320 may include the movable panel 317, the movable panel 326 and an exterior-facing door 321. The computer 125 may provide a control signal to a servomotor that is coupled to the exterior-facing door 321 for opening the exterior-facing door 321 when the delivery vehicle 130 has reached a delivery destination. A person, such as a customer, can reach into the compartment 320 from the road-facing side of the delivery vehicle 130 for retrieving an item located in the compartment 320. The movable panel 317 and the movable panel 326 may be placed in a closed condition by the computer 125 to prevent the customer from accessing any of other items located in the compartment 315 or the compartment 325 adjacent to the compartment 320.

The item that is retrieved from the compartment 320 by the customer may have been located in another compartment, such as the compartment 325 for example, and moved into the compartment 320 prior to the delivery vehicle 130 reaching the delivery destination. The movable panel 326 that separates the compartment 325 from the compartment 320 may be repositioned by the computer 125 to allow the item to be moved from the compartment 325 into the compartment 320 prior to the delivery vehicle 130 reaching the delivery destination.

The compartment 315, which is also accessible to the customer from the road-side of the delivery vehicle 130, includes the movable panel 331, a movable panel 317, and a movable panel 318, and an exterior-facing door 316. The computer 125 may provide a control signal to a servomotor that is coupled to the exterior-facing door 316 for opening the exterior-facing door 316 when the delivery vehicle 130 has reached a delivery destination. The customer can reach into the compartment 315 from the road-facing side of the delivery vehicle 130 for retrieving an item located in the compartment 315. The movable panel 317, the movable panel 331, and the movable panel 318 may be placed in a closed condition by the computer 125 to prevent the customer from accessing any of the other items located in the compartment 320, the compartment 330, and the compartment 310 adjacent to the compartment 315.

The item that is retrieved from the compartment 315 by the customer may have been located in another compartment during an earlier period of time (the compartment 335, for example) and may be moved into the compartment 315 prior to the delivery vehicle 130 reaching the delivery destination.

The compartments provided in this exemplary embodiment offer various benefits such as preventing the various items from being damaged during transit as a result of colliding with each other. Other benefits may include allowing access to the items from not only through the exterior-facing door 105 located at the rear side of the delivery vehicle 130 but also from one or both sides of the delivery vehicle 130. Furthermore, in one exemplary embodiment, each of the compartments are substantially identical in size. For example, each compartment may be a rectangle having a size that is identical to all other compartments. In another exemplary embodiment, some of the compartments may vary in size with respect to other compartments. For example, a size of the compartment 335 may be larger than a size of the compartment 350. The various sizes may be provided so as to allow items of various dimensions and shapes to be transported in the delivery vehicle 130.

Figure 4:
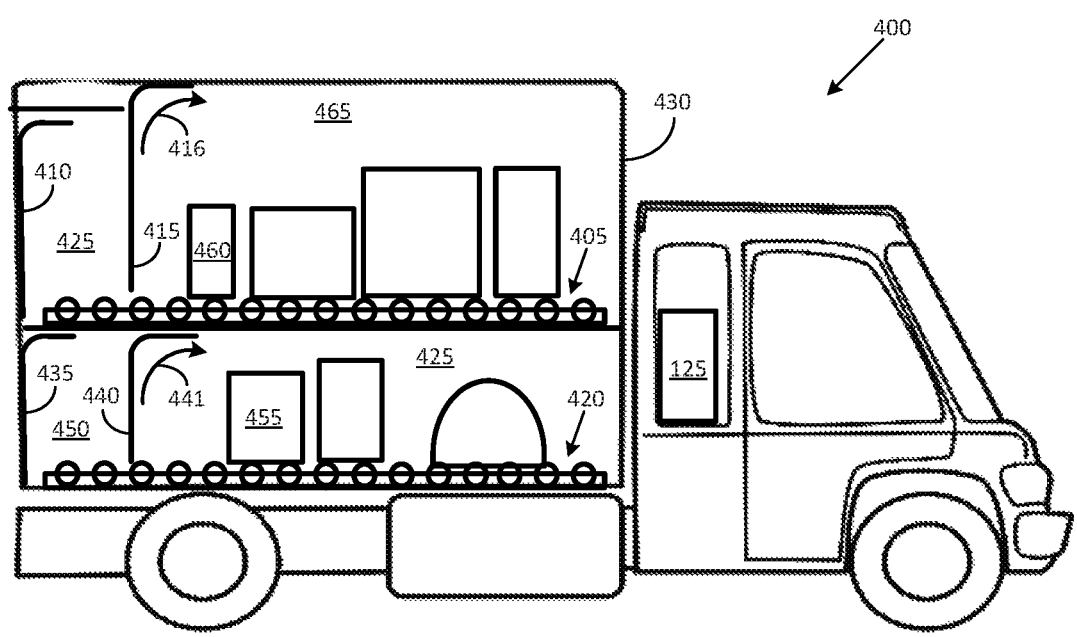
FIG. 4 shows a cut-away view of a delivery vehicle incorporating a second exemplary embodiment of a VIM system in accordance with the disclosure.

FIG. 4 shows a cut-away view of the delivery vehicle 430 incorporating a second exemplary embodiment of a VIM system 400 in accordance with the disclosure. The VIM system 400 includes a bed of rollers 420 and a bed of rollers 405 arranged in a tiered arrangement above the bed of rollers 420. In other implementations, "n" (n>2) bed of rollers may be provided in a tiered arrangement. A first set of items may be placed on the bed of rollers 420 and a second set of items may be placed on the bed of rollers 405. In one exemplary implementation, a set of fixed mounting fixtures may be used to mount the bed of rollers 405 at a fixed height above the bed of rollers 420. The maximum height of any of the first set of items placed upon the bed of rollers 420 is determined on the basis of this fixed height. In another exemplary implementation, a set of adjustable mounting fixtures may be used to mount the bed of rollers 405 at an adjustable height above the bed of rollers 420. Accordingly, the bed of rollers 405 can be placed at a first height above the bed of rollers 420 when one or more of a first set of objects placed upon the bed of rollers 420 is tall. The bed of rollers 405 can be lowered to a second height when all of a second set of objects placed upon the bed of rollers 420 are relatively smaller in height than the first set of objects.

The delivery vehicle 430 can be provided with a first exterior-facing door 435 that allows a customer to reach into an alcove 450 for retrieving one or more items (such as an item 455) that can be moved into the alcove 450 from a stored location on the bed of rollers 420. The computer 125 is configured to operate some or all of the rollers in the bed of rollers 420 for moving the item 455 into the alcove 450. In this exemplary implementation, a movable panel 440 has a garage door configuration and moves in a direction indicated by an arrow 441 when opened under control of the computer 125. The computer 125 may move the movable panel 440 out of the way so as to roll the item 455 into the alcove 450. After rolling the item 455 into the alcove 450, the computer 125 may close the movable panel 440 so as to isolate the alcove 450 from a first enclosed cargo area 425 of the delivery vehicle 430. The computer 125 may open the first exterior-facing door 435 after the delivery vehicle 430 has reached the delivery destination to allow the customer to retrieve the item 455 from the alcove 450.

The delivery vehicle 430 can be provided with a second exterior-facing door 410 that allows a customer to reach into the alcove 425 for retrieving one or more items such as an item 460 that is stored on the bed of rollers 405. The computer 125 is configured to operate some or all of the rollers in the bed of rollers 405 for moving the item 460 into the alcove 425. The moving operation may be carried out by the computer 125 by moving a movable panel 415 out of the way. In this exemplary implementation, the movable panel 415 has a garage door configuration and moves in a direction indicated by an arrow 416 when opened under control of the computer 125 to roll the item 460 into the alcove 425. After rolling the item 460 into the alcove 425, the computer 125 may close the movable panel 415 so as to isolate the alcove 425 from a second enclosed cargo area 465 of the delivery vehicle 430. The computer 125 may then open the second exterior-facing door 410 after the delivery vehicle 430 has reached the delivery destination to allow the customer to retrieve the item 460 from the alcove 425.

The delivery vehicle 430 can be further provided with exterior-facing doors on one or both sides of the delivery vehicle 430. For example, a first set of exterior-facing side doors may be provided on a curb-facing side of the vehicle 430. The first set of exterior-facing side doors may be similar in structure and operation to the first exterior-facing door 435 described above. A second set of exterior-facing side doors may also be provided on the curb-facing side of the vehicle 430. The second set of exterior-facing side doors may be provided parallel to, and above the first set of exterior-facing side doors in a tiered arrangement. Each of the second set of exterior-facing side doors may be similar in construction and operation to the second exterior-facing door 410 described above.

A third set of exterior-facing side doors may be provided on a road-facing side of the vehicle 430. The third set of exterior-facing side doors may be similar in construction and operation to the first exterior-facing door 435 described above. A fourth set of exterior-facing side doors may be provided on the road-facing side of the vehicle 430. The fourth set of exterior-facing side doors may be provided parallel to, and above the third set of exterior-facing side doors in a tiered arrangement. Each of the fourth set of exterior-facing side doors may be similar in construction and operation to the second exterior-facing door 410 described above.

Figure 5:
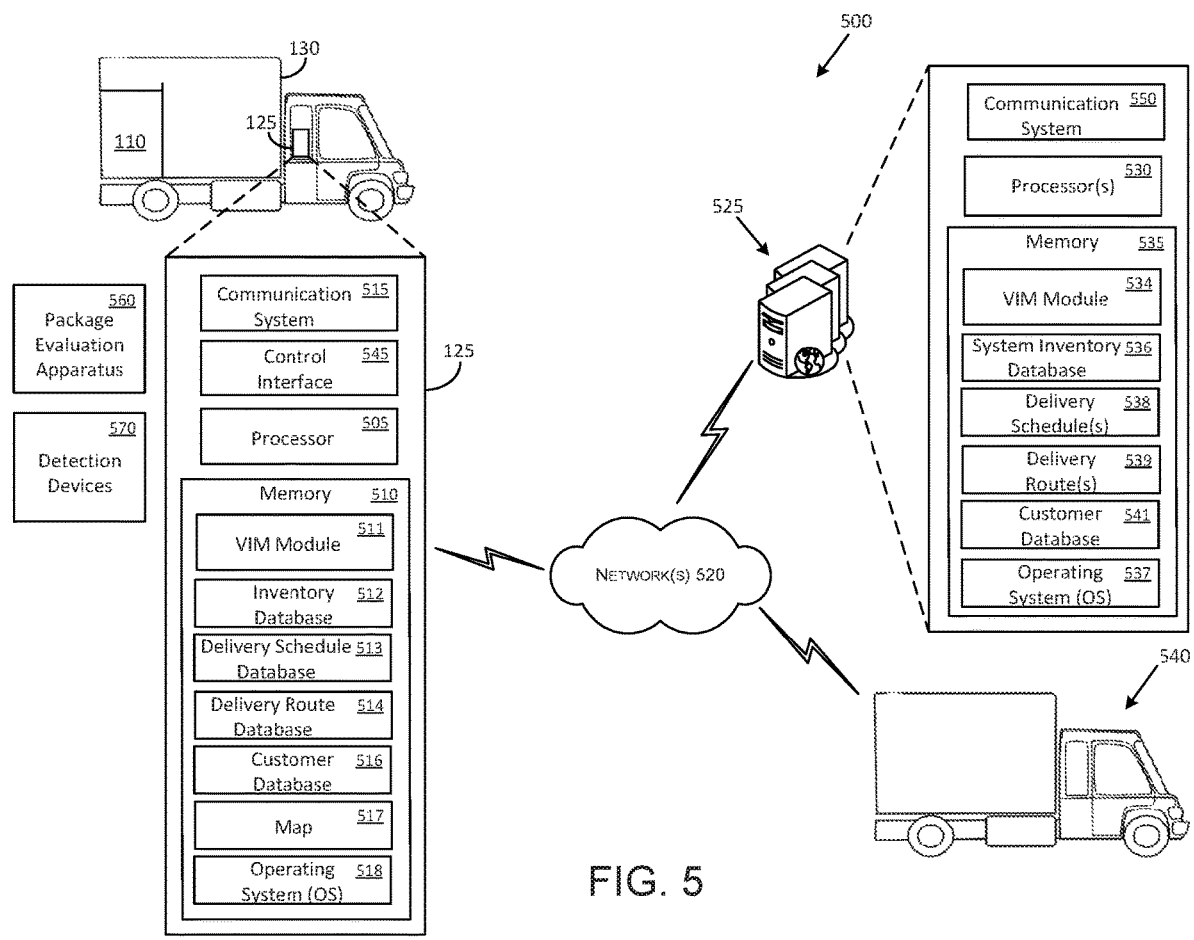
FIG. 5 shows an exemplary network-based implementation of a VIM system in accordance with the disclosure.

FIG. 5 shows an exemplary network-based implementation of a VIM system 500 in accordance with the disclosure. The VIM system 500 may include a network 520 that provides communicative coupling between a server system 525 and the computer 125 in the delivery vehicle 130 (or the delivery vehicle 430). The network 520 may also provide communicative coupling between the server system 525 and a computer in another delivery vehicle 540 that is configured to participate in the VIM system 500. The network 520 can include any one or a combination of a local area network (LAN), a telephone network, a cellular network, a cable network, a wireless network, and/or private/public networks such as the Internet. In some instances, the network 520 may support various wired, wireless, and optical technologies, including Bluetooth, cellular, near-field communication (NFC), Wi-Fi, and/or Wi-Fi direct.

The computer 125 that is provided in the delivery vehicle 130 may include several components such as a communication system 515, a control interface 545, a processor 505, and a memory 510. The communication system 515 may be configured to allow communications between the computer 125 and the server system 525 via the network 520. The control interface 545 may be configured to transmit control signals to servomotors coupled to various rollers in one or more beds of rollers in the delivery vehicle 130 and to various movable panels in the delivery vehicle 130. The memory 510, which is one example of a non-transitory computer-readable medium, may be used to store various code modules and various types of data. For example, the memory 510 may be configured to store a VIM module 511, an inventory database 512, a delivery schedule database 513, a delivery route database 514, a customer database 516, a map 517 of the cargo area of the delivery vehicle 130, and an operating system (OS) 518. The VIM module 511 may include computer-executable instructions for executing various vehicle inventory management procedures in accordance with the disclosure. In one exemplary procedure, the processor 505 executes the computer-executable instructions stored in the memory 510 to perform operations that include, for example, identifying a location of an item placed upon the bed of rollers 120 and activating at least some rollers in the bed of rollers 120 to move the item from one compartment to another compartment of an enclosed cargo area 135 of the delivery vehicle 130 and/or into the alcove 110 in the delivery vehicle 130.

The processor 505 may also communicate with a global positioning system (GPS) device (not shown) that is provided in the delivery vehicle 130 for determining a current location of the delivery vehicle 130 along a delivery route. The delivery route may be identified by using information stored in the delivery route database 514. The processor 505 may then access the delivery schedule database 513 and the customer database 516 to determine an identity of the item 230 (shown in FIG. 2), followed by accessing the map 517 of the cargo area of the delivery vehicle 130 to identify the location of the item 230 upon the bed of rollers 120. The map 517 may be dynamically updated each time one or more items are moved upon the bed of rollers 120, so as to provide accurate and up-to-date location information of the various items placed upon the bed of rollers 120.

After identifying the location of the item 230 upon the bed of rollers 120, the processor 505 may use the control interface 545 to transmit control signals to a set of rollers upon which the item 230 is placed so as to move the item 230 into the alcove 110. The processor 505 may further transmit control signals via the control interface 545 to various movable panels, such as the movable panel 205, when moving the item 230 into the alcove 110. The processor 505 may operate the exterior-facing door 105 after detecting stoppage of the delivery vehicle 130 at the delivery location so as to allow the customer to retrieve the item 230 that has been moved into the alcove 110.

A package evaluation apparatus 560 may be provided in the alcove 110 or located outside the delivery vehicle 130. A few examples of the package evaluation apparatus 560 may include an optical scanner, a weighing scale, an x-ray system, a radio-frequency identification (RFID) system, and a barcode reader. The package evaluation apparatus 560 can be used for determining various characteristics of a package prior to placement of the package in the cargo area 135 of the delivery vehicle 130. For example, an optical scanner may be used to measure an overall size of a package so as to configure one or more compartments in the cargo area 135 of the delivery vehicle 130 to accommodate the package. Thus, if a package is large in size, a movable panel such as the movable panel 327 (shown in FIG. 3) may be opened and the large package placed in a combined space provided by the compartment 325 and the compartment 340. As another example, an RFID system may be used to verify that a first package is stored in a first compartment (compartment 345, for example) and a second package is stored in a second compartment (compartment 320, for example). The RFID system may then be used in cooperation with a GPS system for moving one or both packages into the alcove 110 when the delivery vehicle 130 reaches the respective delivery destinations.

One or more detection devices 570 may be provided in the alcove 110 of the delivery vehicle 130 and coupled to the computer 125. A few examples of detection devices 570 include weight sensors, optical sensors, and motion sensors that may be provided in the alcove 110 and coupled to the computer 125. For example, a weight sensor may be used to detect placement of a package in the alcove 110 and the weight of the package may be communicated to the computer 125. As another example, a motion sensor may be used to detect placement of a package in the alcove 110 and the information communicated to the computer 125.

The server system 525 may be implemented in the form of a single computer or a networked set of computers that can communicate with the computer 125 in the delivery vehicle 130 and other computers provided in other delivery vehicles such as the delivery vehicle 540. In one exemplary implementation, the server system 525 may be a single computer that includes various components such as a communication system 550, a processor 530, and a memory 535. The communication system 550 may be configured to communicate with the computer 125 through the network 520. The memory 535, which is one more example of a non-transitory computer-readable medium, may be used to store various code modules and various types of data. For example, the memory 535 may be configured to store a VIM module 534, a system inventory database 536, one or more delivery schedules 538, one or more delivery routes 539, a customer database 541, and an operating system (OS) 537.

In an exemplary mode of operation, the processor 530 executes the computer-executable instructions stored in the memory 535 to perform some operations in cooperation with the computer 125 provided in the delivery vehicle 130. For example, the processor 530 may use some data stored in the memory 535 (such as the system inventory database 536, the delivery schedules 538, the delivery routes 539, and the customer database 541) to populate and/or update the contents of the memory 510 that is a part of the computer 125 provided in the delivery vehicle 130 and/or another memory that is a part of another computer (not shown) in the delivery vehicle 540. Various operating aspects of the delivery vehicle 540 may be different than that of the delivery vehicle 130. For example, the inventory, the delivery routes and the customers associated with the delivery vehicle 540 may be different than that of the delivery vehicle 130.

A memory device such as the memory 510 and the memory 535 shown in FIG. 5 can include any one memory element or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 6:
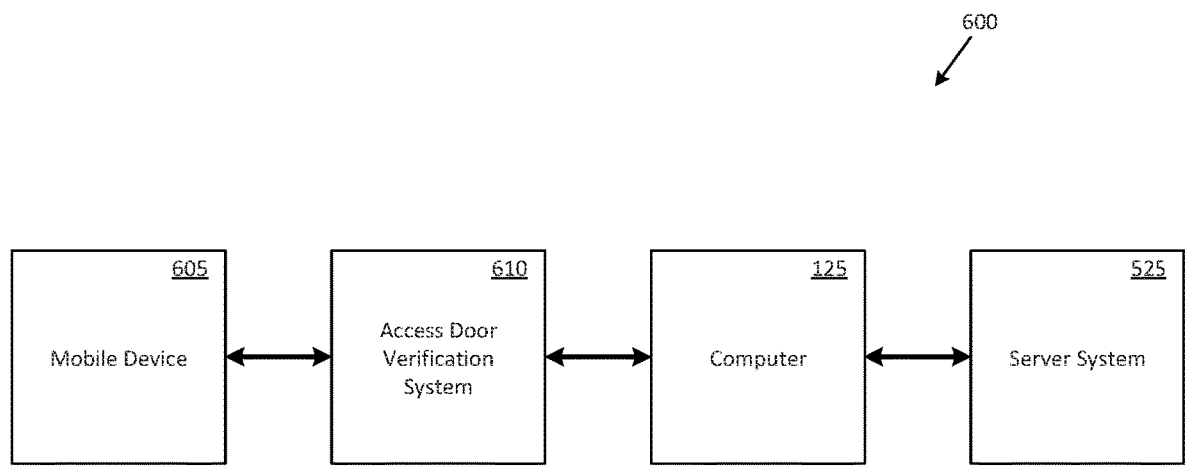
FIG. 6 shows an exemplary modular VIM system in accordance with the disclosure.

FIG. 6 shows an exemplary modular VIM system 600 in accordance with the disclosure. The modular VIM system 600 may include a mobile device 605 that may be communicatively coupled to an access door verification system 610. The access door verification system 610, which may be provided in the delivery vehicle 130, is communicatively coupled to the computer 125. In one exemplary implementation, the delivery vehicle 130 is an autonomous vehicle and the mobile device 605 may be a smartphone, a tablet computer, wearable, or a customized hand-held computer device. The mobile device 605 may be used by an operator, such as an operations manager seated in an office at a remote location, to communicate with the access door verification system 610 to verify a status of one or more access doors of the delivery vehicle 130 (such as the exterior-facing door 105 shown in FIG. 1 or the exterior-facing door 410 shown in FIG. 4). For example, the operator may use the mobile device 605 to communicate with the access door verification system 610 to determine whether the exterior-facing door 105 is in a closed condition while the autonomous vehicle is in motion and/or to determine whether the exterior-facing door 105 is in an open condition when the autonomous vehicle is stopped at a delivery destination. The access door verification system 610 may communicate with the computer 125 to verify various aspects of a delivery at the delivery destination such as to verify that the correct item has been moved into the alcove 110 and/or that the item has been picked up by a customer. The server system 525 may provide various types of information to the computer 125 as has been described above.

Figure 7:
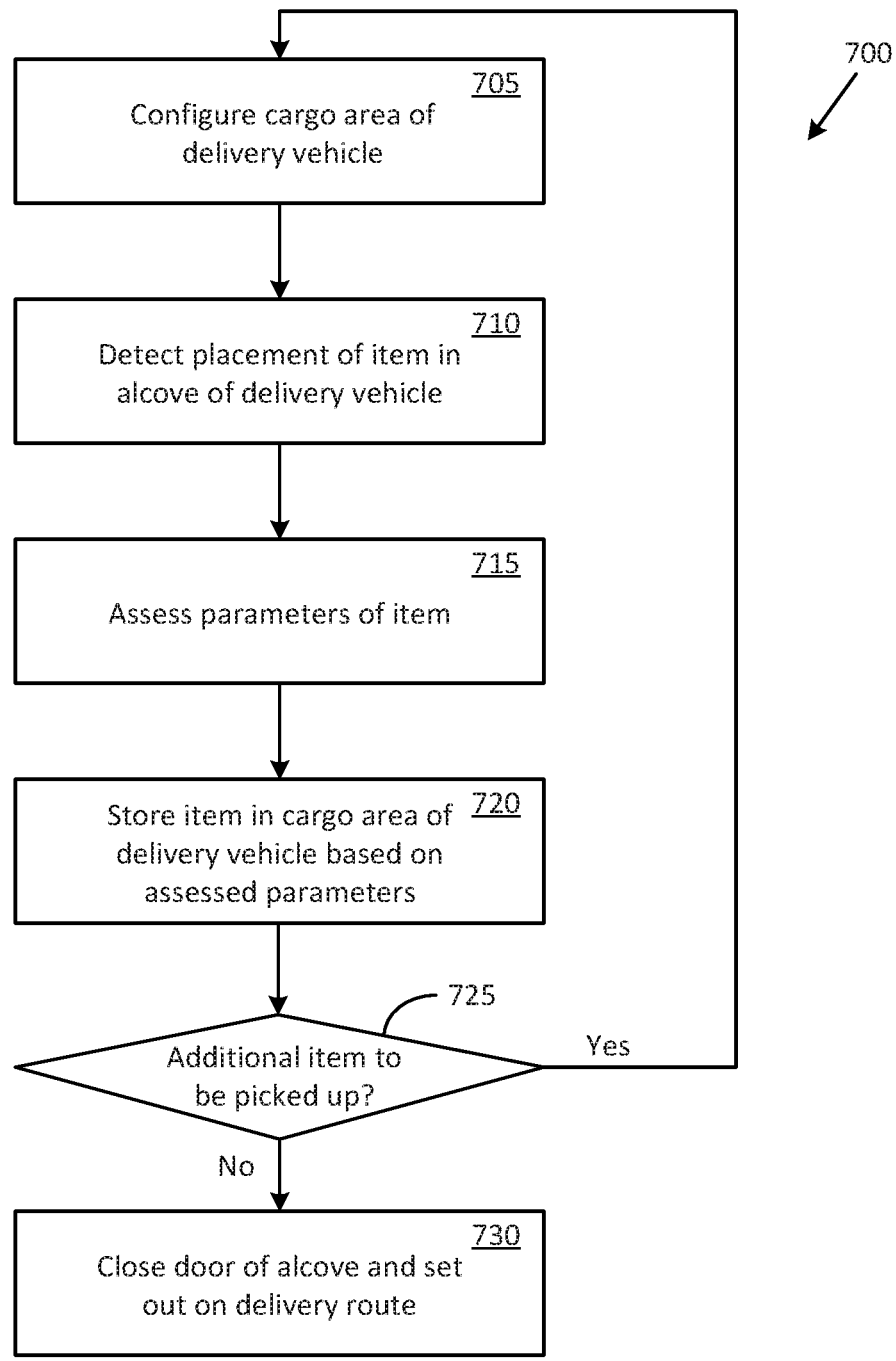
FIG. 7 shows a flowchart of an exemplary method of operation of a VIM system in accordance with the disclosure.

FIG. 7 shows a flowchart 700 of an exemplary method of operation of the VIM system 100 in accordance with the disclosure. The flowchart 700 illustrates a sequence of operations that can be implemented in hardware, software, or a combination thereof. In the context of software, the operations represent computer-executable instructions stored on one or more non-transitory computer-readable media such as the memory 510 and the memory 535, that, when executed by one or more processors such as the processor 505 and the processor 530, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. Some or all of the operations described in the flowchart 700 may be carried out by using an application executed on the computer 125 and/or the server system 525.

At block 705, the enclosed cargo area of a delivery vehicle may be configured to accept one or more items for delivery. For example, this operation may be carried out at a warehouse where various items of various sizes may be stored for pickup by the delivery vehicle prior to the delivery vehicle setting out on a delivery route. At block 710, a computer provided in the delivery vehicle detects placement of an item in an alcove of the delivery vehicle. The detection may be carried out by using one or more detection devices such as weight sensors, optical sensors, and motion sensors that may be provided in the alcove and coupled to the computer. At block 715, one or more parameters of the item that is placed in the alcove may be assessed. In one exemplary implementation, the various parameters may be assessed by using a package evaluation apparatus such as the package evaluation apparatus 560 described above. In another exemplary implementation, the various parameters can be determined by a human being, such as an employee of the warehouse.

At block 720, the item is moved from the alcove into the enclosed area of the delivery vehicle under control of the computer. In one exemplary implementation, the computer may determine that a height, weight, and/or footprint of the item is suitable for placing the item at a particular location or compartment within the cargo area of the delivery vehicle. The computer may then issue control signals to one or more rollers in the bed of rollers to move the item from the alcove to that location. In another exemplary implementation, the computer may determine that a height of the item may make the item unsuitable for placement upon a bed of rollers, such as, for example, the bed of rollers 420 shown in FIG. 4. The computer may then issue control signals to move the item from the alcove to a different bed of rollers that may accommodate the height of the item, such as, for example, the bed of rollers 405 shown in FIG. 4.

In yet another exemplary implementation, the computer may determine that a weight of the item may render the item unsuitable for placement upon a bed of rollers, such as, for example, the bed of rollers 405 shown in FIG. 4. Consequently, the computer may transmit a message to a mobile device such as, for example, the mobile device 605 shown in FIG. 6. The message may recommend that the item be loaded manually (or by a forklift) on to another bed of rollers, such as, for example, the bed of rollers 420 shown in FIG. 4. The message may further suggest loading the item into a particular compartment, such as, for example, the compartment 340 shown in FIG. 3, so as to facilitate unloading of the item on to a curb without having to move the item inside the cargo area of the delivery vehicle.

In an exemplary embodiment, the compartment suggested in the message may be assigned by the processor in accordance with one or more parameters other than weight, such as, for example, delivery schedule, delivery priority, and/or delivery route. The processor may also transmit one or more control signals to rollers on the bed of rollers in order to move other items around on the bed of rollers for making room for the item.

At block 725, a determination is made whether additional items are to be loaded on to the delivery vehicle. If more items have to be loaded, the operations indicated in block 705 through block 725 are executed recursively. If no more items are to be loaded into the delivery vehicle, at block 730, the exterior-facing door of the delivery vehicle is closed. Any additional operations such as moving items around in the enclosed cargo area of the delivery vehicle may then be carried out and the delivery vehicle may set out on a delivery route.

Figure 8:
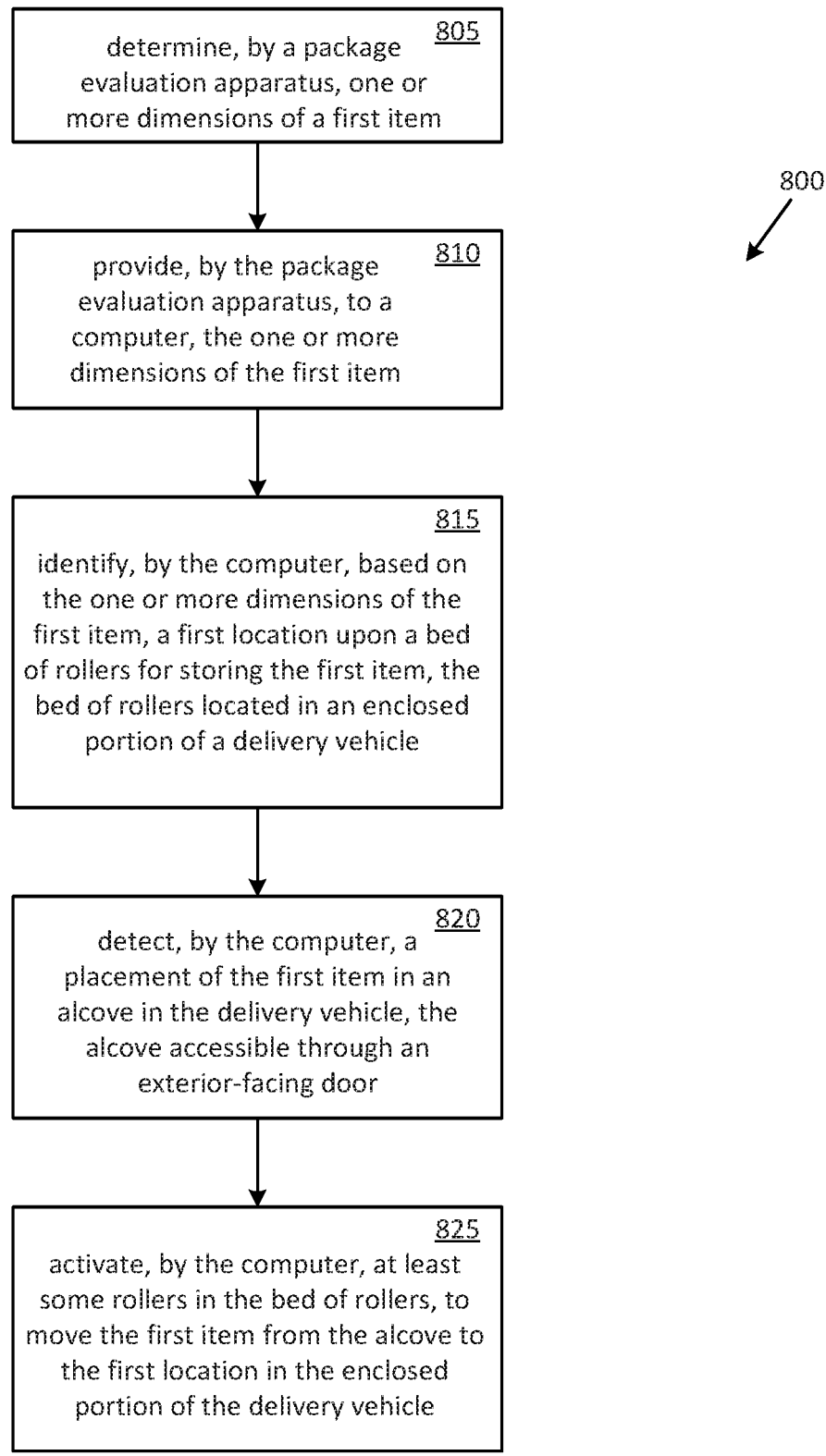
FIG. 8 shows a flowchart of another exemplary method of operation of a VIM system in accordance with the disclosure.

FIG. 8 shows a flowchart 800 of another exemplary method of operation of the VIM system 100 in accordance the disclosure. At block 805, a package evaluation apparatus may be used to determine one or more dimensions of a first item that is to be loaded on to a delivery vehicle. In one example implementation, a package evaluation apparatus such as the package evaluation apparatus 560 may be an optical scanner that is used to measure one or more dimensions or an overall size of the first item. At block 810, the package evaluation apparatus may provide to a computer, information such as the dimensions of the first item. At block 815, the computer may identify a first location upon a bed of rollers for storing the first item. The bed of rollers is located in an enclosed portion of the delivery vehicle. The computer may identify the first location on the basis of the information provided to the computer by the package evaluation apparatus.

In an exemplary embodiment, the package evaluation apparatus is located outside the delivery vehicle and information about the first item may be wirelessly transmitted to the computer located in the delivery vehicle. The first item may be moved from the location at which the package evaluation apparatus is placed to the delivery vehicle after the evaluation has been completed. At block 820, the computer detects placement of the first item in an alcove of the delivery vehicle. The detection may be carried out by using one or more detection devices. The alcove may be accessible through an exterior-facing door of the delivery vehicle. At block 825, the computer may activate some rollers in the bed of rollers to move the first item from the alcove to the first location in the enclosed portion of the delivery vehicle. The exterior-facing door of the delivery vehicle may then be closed and the delivery vehicle may proceed towards a delivery destination for the first item. The delivery destination may be one of several destinations along a delivery route.

Figure 9:
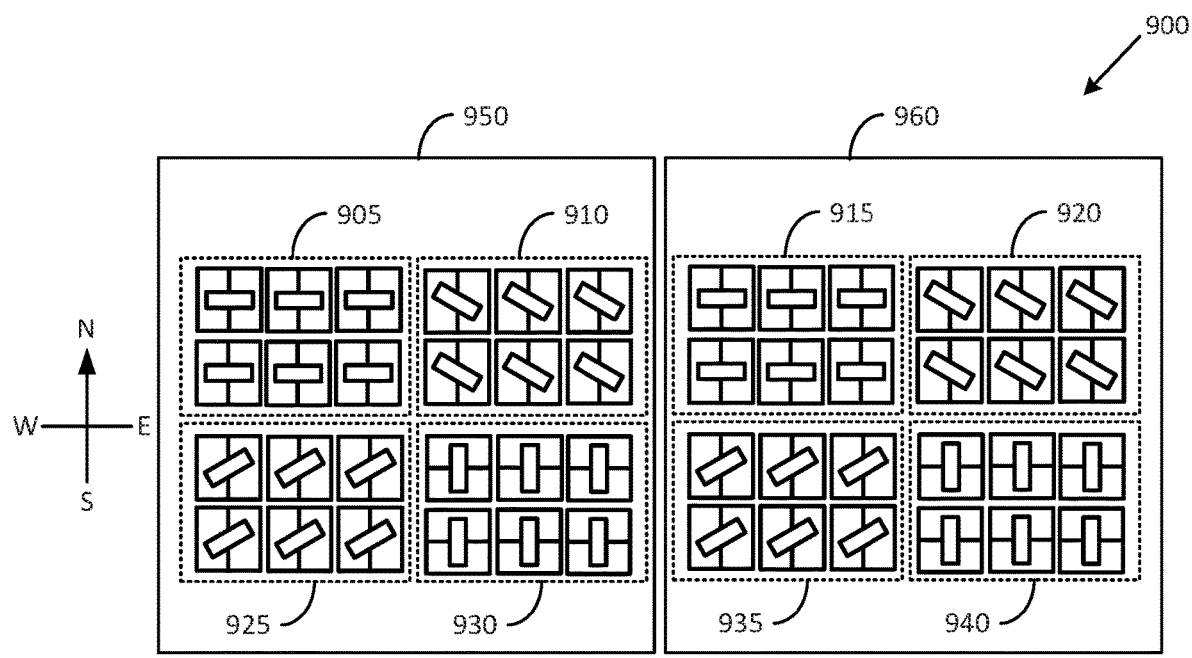
FIG. 9 illustrates a portion of a third exemplary bed of rollers that may be a component of a VIM system in accordance with the disclosure.

FIG. 9 illustrates a third exemplary bed of rollers 900 that may be a component of the VIM system 100 in accordance with the disclosure. The third exemplary bed of rollers 900 includes a first set of rollers 950 that includes a first subset of rollers 905, a second subset of rollers 910, a third subset of rollers 925, and a fourth subset of rollers 930. Each roller in the first subset of rollers 905 includes a wheel that is oriented in an east-west direction. The first subset of rollers 905 may be used to move a package (not shown) when placed upon the bed of rollers 900 to be moved under control of the computer 125 in either an eastwards direction or a westwards direction.

Each roller in the second subset of rollers 910 includes a wheel that is oriented in a northwest-southeast direction. The second subset of rollers 910 may be used to move a package (not shown) when placed upon the bed of rollers 900 to be moved under control of the computer 125 in either a northwest direction or a southeast direction.

Each roller in the third subset of rollers 925 includes a wheel that is oriented in a northeast-southwest direction. The third subset of rollers 925 may be used to move a package (not shown) when placed upon the bed of rollers 900 to be moved under control of the computer 125 in either a northeast direction or a southwest direction.

Each roller in the fourth subset of rollers 930 includes a wheel that is oriented in a north-south direction. The fourth subset of rollers 930 may be used to move a package (not shown) when placed upon the bed of rollers 900 to be moved under control of the computer 125 in either a north direction or a south direction.

The third exemplary bed of rollers 900 can include several more sets of rollers that are identical to the first set of rollers 950. For example, the third exemplary bed of rollers 900 can include a second set of rollers 960 that includes a fifth subset of rollers 915, a sixth subset of rollers 920, a seventh subset of rollers 935, and an eighth subset of rollers 940. The fifth subset of rollers 915 may be identical to the first subset of rollers 905. The sixth subset of rollers 920 may be identical to the second subset of rollers 910. The seventh subset of rollers 935 may be identical to the third subset of rollers 925. The eighth subset of rollers 940 may be identical to the fourth subset of rollers 930.

Figure 10:
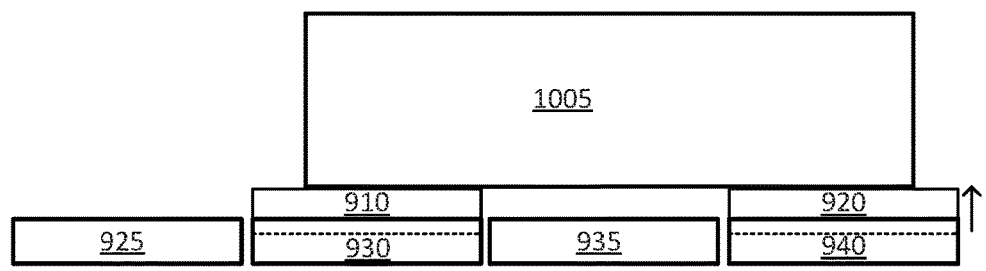
FIG. 10 illustrates the third exemplary bed of rollers when placed in an exemplary configuration.

FIG. 10 illustrates the third bed of rollers 900 when placed in an exemplary operating condition. In this exemplary condition, the second subset of rollers 910 and the sixth subset of rollers 920 (which is identical to the second subset of rollers 910) is raised to a height above that of other subsets of rollers in the third bed of rollers 900. Other subsets of rollers (not shown) in the bed of rollers 900 that are also identical to the second subset of rollers 910 may be similarly raised to the same height. A package 1005 that is placed upon the third bed of rollers 900 can now be moved under control of the computer 125 in either a northwest direction or a southeast direction. Other combinations of subsets of rollers can be similarly set for moving the package 1005 in various other directions.

Example embodiments of the disclosure may include one or more of the following examples:

Example 1 may include a method comprising: determining, by a computer, a first location of a first item placed upon a bed of rollers in an enclosed portion of a delivery vehicle; and activating, by the computer, at least some rollers in the bed of rollers, to move the first item from the first location in the enclosed portion of the delivery vehicle to an alcove in the delivery vehicle, the alcove accessible through an exterior-facing door.

Example 2 may include the method of example 1 and/or some other example herein, wherein the first location is in a first compartment inside the delivery vehicle, and wherein moving the first item to the alcove in the delivery vehicle comprises: repositioning, under control of the computer, a first panel that separates the first compartment from a second compartment in the delivery vehicle; and moving, under control of the computer, the first item from the first compartment to the second compartment after repositioning the first panel.

Example 3 may include the method of example 2 and/or some other example herein, wherein the delivery vehicle is an autonomous vehicle, and wherein moving the first item to the alcove in the autonomous vehicle further comprises: repositioning, under control of the computer, a second panel that separates the second compartment from a third compartment in the autonomous vehicle; and moving, under control of the computer, a second item from the second compartment to the third compartment after repositioning the second panel to make room for the first item.

Example 4 may include the method of example 1 and/or some other example herein, wherein the delivery vehicle is an autonomous vehicle, and wherein the autonomous vehicle includes a set of compartments, the set of compartments comprising: a first compartment configured to accommodate the first item, the first compartment including at least a first panel that is repositionable under control of the computer; and a second compartment configured to accommodate the first item after the first panel is repositioned by the computer.

Example 5 may include the method of example 1 and/or some other example herein, wherein the delivery vehicle is an autonomous vehicle, and wherein the alcove includes at least a first exterior-facing door, and wherein the method further comprises: opening, under control of the computer, the first exterior-facing door to offer access to the first item in the alcove from outside the autonomous vehicle.

Example 6 may include the method of example 5 and/or some other example herein, wherein the first exterior-facing door is located in at least one of a rear wall of the autonomous vehicle, a first side wall of the autonomous vehicle, a second side wall of the autonomous vehicle, or a roof of the autonomous vehicle.

Example 7 may include the method of example 1 and/or some other example herein, wherein activating, by the computer, at least some rollers in the bed of rollers comprises operating a first servomotor to rotate a first roller in one of at least two directions.

Example 8 may include a method comprising: determining, by a package evaluation apparatus, one or more dimensions of a first item; providing, by the package evaluation apparatus, to a computer, the one or more dimensions of the first item; and identifying, by the computer, based on the one or more dimensions of the first item, a first location upon a bed of rollers for storing the first item, the bed of rollers located in an enclosed portion of a delivery vehicle.

Example 9 may include the method of example 8 and/or some other example herein, further comprising: detecting, by the computer, a placement of the first item in an alcove in the delivery vehicle, the alcove accessible through an exterior-facing door; and activating, by the computer, at least some rollers in the bed of rollers, to move the first item from the alcove to the first location in the enclosed portion of the delivery vehicle.

Example 10 may include the method of example 9 and/or some other example herein, wherein the package evaluation apparatus comprises at least one of a radio-frequency identification (RFID) system or a barcode reader, the method further comprising: determining, by the at least one of the RFID system or the barcode reader, a delivery destination of the first item; determining, by the computer, a second location upon the bed of rollers for storing the first item while the delivery vehicle is traveling to the delivery destination of the first item; and activating, by the computer, at least a first roller in the bed of rollers, to move the first item from the first location in the enclosed portion of the delivery vehicle to the second location upon the bed of rollers.

Example 11 may include the method of example 10 and/or some other example herein, further comprising: activating, by the computer, at least a second roller in the bed of rollers, to move the first item from the second location in the enclosed portion of the delivery vehicle to the alcove when the delivery vehicle reaches the delivery destination.

Example 12 may include the method of example 9 and/or some other example herein, wherein the bed of rollers comprises one or more rollers configured to rotate in one of at least two directions under control of the computer.

Example 13 may include the method of example 9 and/or some other example herein, wherein the delivery vehicle is an autonomous vehicle, and wherein the first location is configured as a first compartment for storing the first item, and wherein moving the first item from the alcove to the first location comprises: repositioning, under control of the computer, a first panel that separates the first compartment from a second compartment in the enclosed portion of the autonomous vehicle; and making room for the first item by moving, under control of the computer, a second item stored in the first compartment to the second compartment after repositioning the first panel.

Example 14 may include the method of example 13 and/or some other example herein, wherein repositioning the first panel comprises moving the first panel out of a path of movement of the second item from the first compartment to the second compartment.

Example 15 may include a delivery vehicle comprising: a first bed of rollers that includes a first section located in an enclosed portion of the delivery vehicle and a second section located in a first alcove that is accessible from outside the delivery vehicle through a first exterior-facing door; at least one memory that stores computer-executable instructions; and at least one processor configured to access the at least one memory and execute the computer-executable instructions to at least: identify a location of a first item placed upon the first section of the first bed of rollers; and activate at least some rollers in the first bed of rollers, to move the first item from the location in the first section to the first alcove in the delivery vehicle.

Example 16 may include the delivery vehicle of example 15 and/or some other example herein, wherein the delivery vehicle is an autonomous vehicle, and further comprising: a second bed of rollers that includes a third section located in the enclosed portion of the autonomous vehicle and a fourth section located in a second alcove that is accessible from outside the delivery vehicle through a second exterior-facing door, the second bed of rollers located one of above or below the first bed of rollers in a tiered arrangement.

Example 17 may include the delivery vehicle of example 15 and/or some other example herein, wherein the delivery vehicle is an autonomous vehicle, and wherein the first bed of rollers comprises: a first roller coupled to a servomotor, the servomotor configured to receive control signals from the at least one processor for rotating the first roller in one of at least two directions.

Example 18 may include the delivery vehicle of example 15 and/or some other example herein, wherein the delivery vehicle is an autonomous vehicle, and wherein the first section of the first bed of rollers comprises: a first compartment for storing the first item upon the first bed of rollers; a second compartment for storing a second item upon the first bed of rollers; and a repositionable first panel located between the first compartment and the second compartment.

Example 19 may include the delivery vehicle of example 18 and/or some other example herein, wherein the at least one processor is further configured to access the at least one memory and execute the computer-executable instructions to at least: reposition the repositionable first panel to allow movement of the first item out of the first compartment when moving the first item from the location in the first section to the first alcove in the delivery vehicle.

Example 20 may include the delivery vehicle of example 15 and/or some other example herein, wherein the delivery vehicle is an autonomous vehicle, and wherein the first exterior-facing door is located in at least one of a rear wall of the autonomous vehicle, a first side wall of the autonomous vehicle, a second side wall of the autonomous vehicle, or a roof of the autonomous vehicle.

Example 21 may include an apparatus comprising means for performing a method as claimed in any of the preceding examples.

Example 22 may include machine-readable storage including machine-readable instructions, when executed, to implement a method as claimed in any preceding example.

Example 23 may include machine-readable storage including machine-readable instructions, when executed, to implement a method or realize an apparatus as claimed in any preceding example.

Example 24 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 25 may include an apparatus comprising logic, modules, and/or circuitry to perform one or more elements of a method described in or related to any of examples 1-20, or any other method or process described herein.

Example 26 may include a method, technique, or process as described in or related to any of examples 1-20, or portions or parts thereof.

Example 27 may include an apparatus comprising: one or more processors and one or more computer readable media comprising instructions that, when executed by the one or more processors, cause the one or more processors to perform the method, techniques, or process as described in or related to any of examples 1-20, or portions thereof.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an exemplary implementation" etc., indicate that the embodiment or implementation described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, mobile devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
    determining, by a computer, a first location of a first item placed upon a first bed of rollers in an enclosed portion of a delivery vehicle; and
    activating, by the computer, at least some rollers in the first bed of rollers, to move the first item from the first location in the enclosed portion of the delivery vehicle to an alcove in the delivery vehicle, the alcove accessible through an exterior-facing door, wherein the first location is in a first compartment inside the delivery vehicle, and wherein moving the first item to the alcove in the delivery vehicle comprises:
    repositioning, under control of the computer, a first panel that separates the first compartment from a second compartment in the delivery vehicle; and
    moving, under control of the computer, the first item from the first compartment to the second compartment after repositioning the first panel.

2. The method of claim 1, wherein the delivery vehicle is an autonomous vehicle, and wherein moving the first item to the alcove in the autonomous vehicle further comprises:
    repositioning, under control of the computer, a second panel that separates the second compartment from a third compartment in the autonomous vehicle; and
    moving, under control of the computer, a second item from the second compartment to the third compartment after repositioning the second panel to make room for the first item, wherein the first compartment and second compartment are internal to the vehicle and separate from the alcove.

3. The method of claim 1, wherein the delivery vehicle is an autonomous vehicle, and wherein the autonomous vehicle includes a set of compartments, the set of compartments comprising:
- a first compartment configured to accommodate the first item, the first compartment including at least a first panel that is repositionable under control of the computer; and
- a second compartment configured to accommodate the first item after the first panel is repositioned by the computer.

4. The method of claim 1, wherein activating, by the computer, at least some rollers in the first bed of rollers comprises operating a first servomotor to rotate a first roller in one of at least two directions.

5. The method of claim 1, wherein the first compartment comprises a plurality of panels configured to be repositioned.

6. The method of claim 1, wherein the delivery vehicle is an autonomous vehicle, and wherein the alcove includes at least a first exterior-facing door, and wherein the method further comprises:
- opening, under control of the computer, the first exterior-facing door to offer access to the first item in the alcove from outside the autonomous vehicle.

7. The method of claim 6, wherein the first exterior-facing door is located in at least one of a rear wall of the autonomous vehicle, a first side wall of the autonomous vehicle, a second side wall of the autonomous vehicle, or a roof of the autonomous vehicle.

8. The method of claim 1, wherein the delivery vehicle further comprises a second bed of rollers located at a first height above the first bed of rollers.

9. The method of claim 8, wherein the second bed of rollers are configured to be adjusted to a second height above the first bed of rollers.

10. A method comprising:
- determining, by a package evaluation apparatus, one or more dimensions of a first item;
- providing, by the package evaluation apparatus, to a computer, the one or more dimensions of the first item; and
- identifying, by the computer, based on the one or more dimensions of the first item, a first location upon a bed of rollers for storing the first item, the bed of rollers located in an enclosed portion of a delivery vehicle;
- detecting, by the computer, a placement of the first item in an alcove in the delivery vehicle, the alcove accessible through an exterior-facing door; and
- activating, by the computer, at least some rollers in the bed of rollers, to move the first item from the alcove to the first location in the enclosed portion of the delivery vehicle, wherein the first location is configured as a first compartment for storing the first item, and wherein moving the first item from the alcove to the first location comprises:
  - under control of the computer, a first panel that separates the first compartment from a second compartment in the enclosed portion of the autonomous vehicle; and
  - making room for the first item by moving, under control of the computer, a second item stored in the first compartment to the second compartment after repositioning the first panel.

11. The method of claim 10, wherein the bed of rollers comprises one or more rollers configured to rotate in one of at least two directions under control of the computer.

12. The method of claim 10, wherein repositioning the first panel comprises moving the first panel out of a path of movement of the second item from the first compartment to the second compartment.

13. The method of claim 10, wherein the package evaluation apparatus comprises at least one of a radio-frequency identification (RFID) system or a barcode reader, the method further comprising:
- determining, by the at least one of the RFID system or the barcode reader, a delivery destination of the first item;
- determining, by the computer, a second location upon the bed of rollers for storing the first item while the delivery vehicle is traveling to the delivery destination of the first item; and
- activating, by the computer, at least a first roller in the bed of rollers, to move the first item from the first location in the enclosed portion of the delivery vehicle to the second location upon the bed of rollers.

14. The method of claim 13, further comprising:
- activating, by the computer, at least a second roller in the bed of rollers, to move the first item from the second location in the enclosed portion of the delivery vehicle to the alcove when the delivery vehicle reaches the delivery destination.

15. A delivery vehicle comprising:
- a first bed of rollers that includes a first section located in an enclosed portion of the delivery vehicle and a second section located in a first alcove that is accessible from outside the delivery vehicle through a first exterior-facing door;
- at least one memory that stores computer-executable instructions; and
- at least one processor configured to access the at least one memory and execute the computer-executable instructions to at least:
- identify a location of a first item placed upon the first section of the first bed of rollers; and
- activate at least some rollers in the first bed of rollers, to move the first item from the location in the first section to the first alcove in the delivery vehicle, wherein the first section of the first bed of rollers comprises:
- a first compartment for storing the first item upon the first bed of rollers;
- a second compartment for storing a second item upon the first bed of rollers; and
- a repositionable first panel located between the first compartment and the second compartment.

16. The delivery vehicle of claim 15, wherein the delivery vehicle is an autonomous vehicle, and further comprising:
- a second bed of rollers that includes a third section located in the enclosed portion of the autonomous vehicle and a fourth section located in a second alcove that is accessible from outside the delivery vehicle through a second exterior-facing door, the second bed of rollers located one of above or below the first bed of rollers in a tiered arrangement.

17. The delivery vehicle of claim 15, wherein the delivery vehicle is an autonomous vehicle, and wherein the first bed of rollers comprises:
- a first roller coupled to a servomotor, the servomotor configured to receive control signals from the at least one processor for rotating the first roller in one of at least two directions.

18. The delivery vehicle of claim 15, wherein the at least one processor is further configured to access the at least one memory and execute the computer-executable instructions to at least:

reposition the repositionable first panel to allow movement of the first item out of the first compartment when moving the first item from the location in the first section to the first alcove in the delivery vehicle.

19. The delivery vehicle of claim 15, wherein the delivery vehicle is an autonomous vehicle, and wherein the first exterior-facing door is located in at least one of a rear wall of the autonomous vehicle, a first side wall of the autonomous vehicle, a second side wall of the autonomous vehicle, or a roof of the autonomous vehicle.

* * * * *